(12) United States Patent
Gawdiak et al.

(10) Patent No.: US 6,968,338 B1
(45) Date of Patent: Nov. 22, 2005

(54) EXTENSIBLE DATABASE FRAMEWORK FOR MANAGEMENT OF UNSTRUCTURED AND SEMI-STRUCTURED DOCUMENTS

(75) Inventors: Yuri O. Gawdiak, Sunnyvale, CA (US); Tracy T. La, Sunnyvale, CA (US); Shu-Chun Y. Lin, Fremont, CA (US); David A. Maluf, Mountain View, CA (US); Khai Peter B. Tran, Oakland, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 323 days.

(21) Appl. No.: 10/232,975

(22) Filed: Aug. 29, 2002

(51) Int. Cl.[7] .............................................. G06F 17/30
(52) U.S. Cl. .............................. 707/100; 707/4; 707/9; 707/10; 709/217; 715/513
(58) Field of Search .................. 707/1–10, 100–104.1, 707/200–206; 709/217, 219, 225, 229; 715/513–515

(56) References Cited

U.S. PATENT DOCUMENTS

| | | | | |
|---|---|---|---|---|
| 5,592,667 | A | * | 1/1997 | Bugajski ...................... 707/102 |
| 5,991,756 | A | * | 11/1999 | Wu ................................. 707/3 |
| 6,018,733 | A | * | 1/2000 | Kirsch et al. ................... 707/3 |
| 6,338,056 | B1 | | 1/2002 | Dessloch et al. ............... 707/2 |
| 6,418,448 | B1 | | 7/2002 | Sarkar ...................... 707/104.1 |
| 6,446,061 | B1 | | 9/2002 | Doerre et al. .................. 707/3 |
| 6,553,364 | B1 | * | 4/2003 | Wu ................................. 707/1 |
| 6,915,291 | B2 | * | 7/2005 | Carlson et al. ................. 707/2 |

OTHER PUBLICATIONS

M. B. Jones et al., "Managing Scientific Metadata", IEEE Internet Computing, pp. 59-68 (Sep.-Oct. 2001).

* cited by examiner

Primary Examiner—Mohammad Ali
Assistant Examiner—Jean Bolte Fleurantin
(74) Attorney, Agent, or Firm—Robert M. Padilla; John F. Schipper

(57) ABSTRACT

Method and system for querying a collection of Unstructured or semi-structured documents to identify presence of, and provide context and/or content for, keywords and/or keyphrases. The documents are analyzed and assigned a node structure, including an ordered sequence of mutually exclusive node segments or strings. Each node has an associated set of at least four, five or six attributes with node information and can represent a format marker or text, with the last node in any node segment usually being a text node. A keyword (or keyphrase) is specified, and the last node in each node segment is searched for a match with the keyword. When a match is found at a query node, or at a node determined with reference to a query node, the system displays the context and/or the content of the query node.

20 Claims, 6 Drawing Sheets

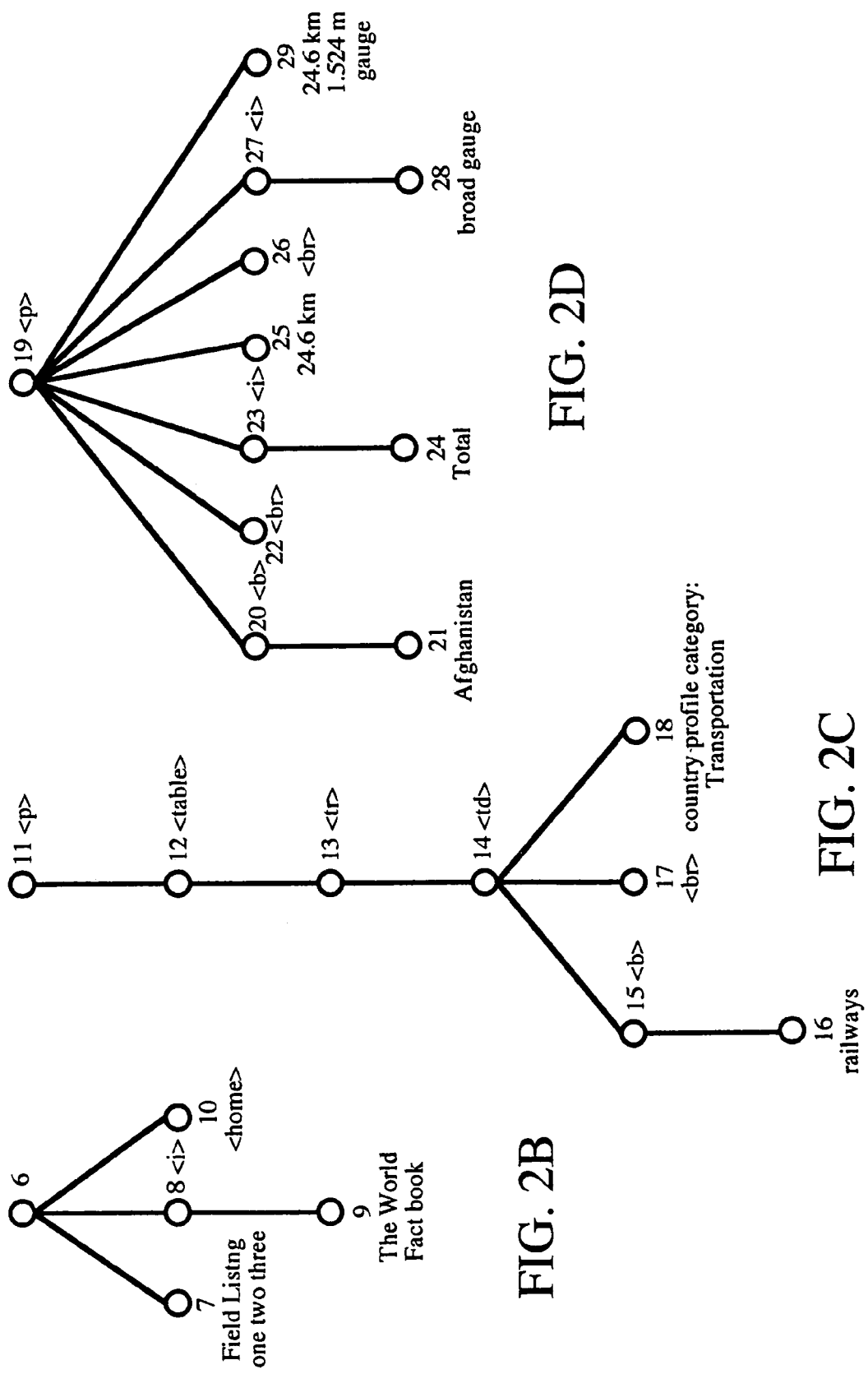

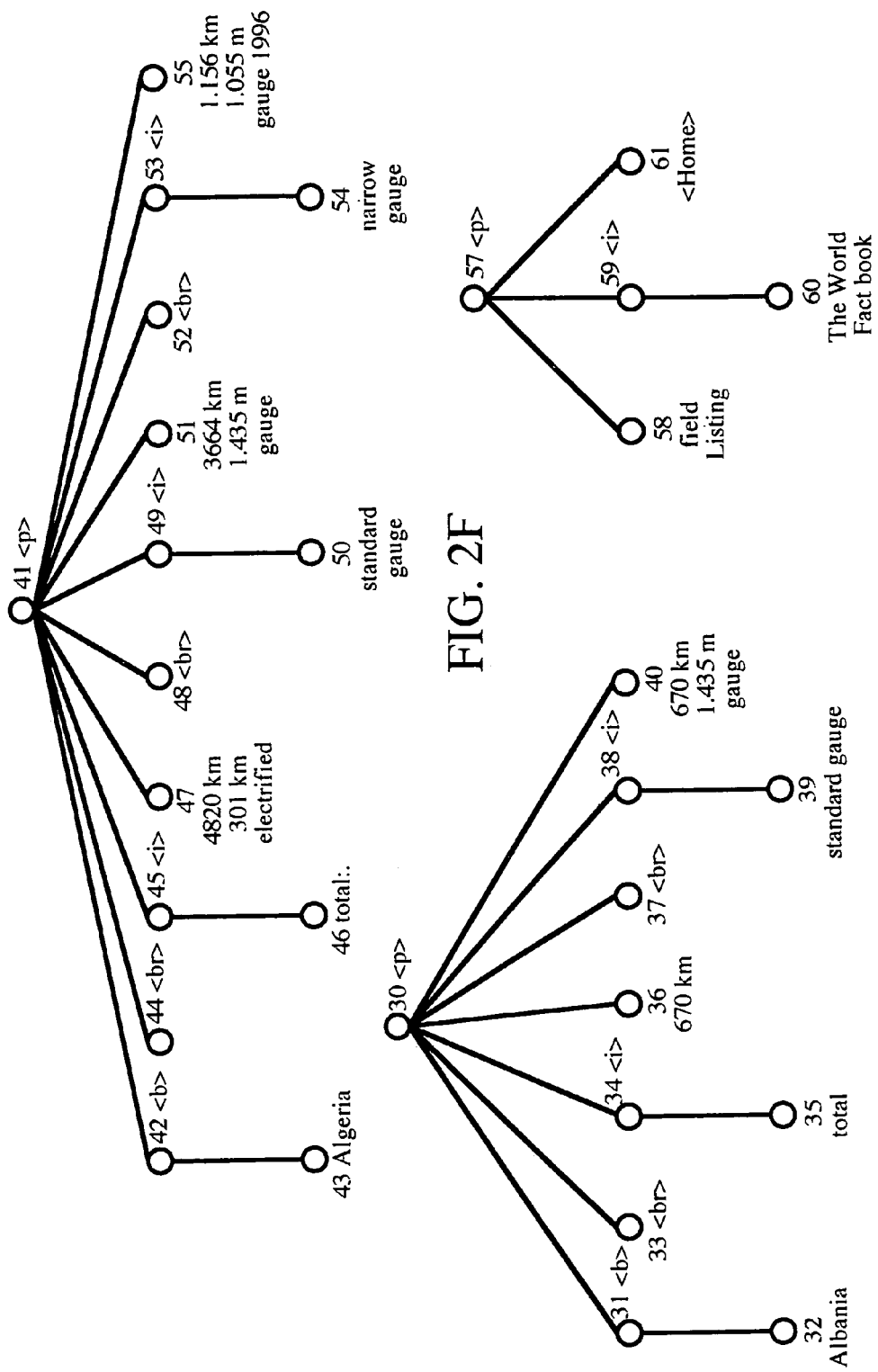

EXTENSIBLE DATABASE FRAMEWORK FOR MANAGEMENT OF UNSTRUCTURED AND SEMI-STRUCTURED DOCUMENTS

FIELD OF THE INVENTION

This invention relates to management of, and searching in, databases containing documents that are not structured.

BACKGROUND OF THE INVENTION

In many technical fields, up to 80 percent of the mission-critical information exists in heterogeneous or unstructured formats, such as spreadsheets, word processing documents, pdf, Web pages and other presentation formats (collectively referred to as "documents" herein). These semi-structured, and unstructured documents are scattered across many domains, and the fraction of documents in such forms is probably increasing as the variety of formats increases. Traditional approaches to data management and integration, such as data warehousing and customized point-to-point communication connections between specific applications and backend databases are expensive, time consuming, risky to implement and will probably provide a decreasing fraction of a total solution—if, indeed, a total solution can ever be implemented.

Most commercial off the shelf (COTS) tools available today for database querying are web-based technologies that will retrieve only the content of data stored in particular formats. Most COTS tools are limited to storing retrieving and querying data in a flat file system. Queries of arbitrary format (or unstructured) documents cannot be implemented. Further, performance complex queries spanning both context and content keyword searches, are either inefficient or non-existent.

What is needed is a document database framework for managing and searching within the database that is robust and flexible, that makes effective use of an XML formalism, and that can be applied to unstructured and semi-structured documents in the database. Preferably, the system should work with most proprietary and non-proprietary database integration software. Preferably, the system should allow use of simple queries and hierarchical queries.

SUMMARY OF THE INVENTION

The invention provides a format and a searchable node structure for unstructured and semi-structured documents. One begins by assigning a node to each of a sequence of data fragments or blocks of a document (title, introduction, each text paragraph, each equation, each visual images, each photograph, conclusion, table of contents, index, etc.), where each node has an assembly of labels. In one embodiment of the invention, the labels or attributes for each node include the following: DOCID (a unique number assigned to the document); NODEID (a unique identifier for each node and associated data fragment or block, when restricted to that document); NODENAME (a descriptive name for the node, usually the first keyword within certain brackets associated with the node); NODETYPE (identifies a node type, drawn from a small list of mutually exclusive node types, and indicates processing requirements for the data fragment associated with that node); PARENTROWID (identifies a parent node, if any, for the node and includes a ROWID identification number for a preceding node); and SIBLINGID (identifies a ROWID for a sibling node, if any, to the immediate left of the node). ROWID identifies a physical record location on a computer disk.

The node type list includes: an element (contains one or more other nodes); text (indicates that NODEDATA contains one or more free text block; also serves as a default node type); context (indicates that NODEDATA describes an activity associated with the following node); intense (indicates that NODEDATA describes a context of the following node); simulation (indicates that NODEDATA for a node is constructed through one or more external processes, rather than being stored within the system); and binary (indicates that the NODEDATA is composed of a binary block).

An embodiment of a method for practicing the invention includes the following actions. An Unstructured collection of at least one document is provided. Each document in the collection is analyzed and is provided with a sequence of nodes, with each node having an array of at least four attributes, as described in the preceding.

The system receives a query for searching the document collection, including specification of at least one query keyword, and provides information on selected attributes (from the array of four or more attributes) for each of the one or more selected documents in which the keyword occurs at least once. For each of the selected documents, the system begins at an initial node of the selected document whose NODE DATA attribute contains the keyword, optionally moves to a left-adjacent node (a sibling node immediately to the left of, or the parent node of, the initial node) to determine context of this occurrence of the keyword. Optionally, the system can move to a right-adjacent node or to a selected child node to further evaluate content for the initial node.

Within any one hierarchical level of sibling nodes: (1) the system optionally moves from the initial node to the adjacent node to the left in the sibling group, or, if the present node is the left-most node in the sibling group, moves upward to the parent node of the present node (referred to collectively as the "left-adjacent node"), to search for context of the present node; (2) optionally moves to a right-adjacent node, and/or to a selected child node for the initial node, for further content searching.

The system queries a given node to determine if at least one data fragment and associated document node provides a (partial) match to the search query attribute(s). The system displays context and/or content for each occurrence of the keyword in the node structure.

The system uses a combination of relational and object-oriented (tree representation) views to decouple the complexity of handling massively rich data representations.

BRIEF DESCRIPTION OF THE DRAWINGS

FIGS. 2A–2G illustrate a suitable node structure for an excerpted document.

DESCRIPTION OF BEST MODES OF THE INVENTION

Consider a collection of documents including at least one document and preferably including hundreds or thousands of documents. Each document is represented as a connected array of nodes at various node levels, with each node optionally corresponding to an HTML marker (approximately 50 in number) or XML marker that indicates a data fragment or block of data that is part of the document. A data fragment may be a format marker, such as <p> (begin paragraph), </p> (end paragraph), <b> (begin boldface), </b> (end boldface), <i>(begin italic), </i> (end italic), <s> (space), <uc> (begin upper case), </uc> (end upper case), <lc> (begin lower case), <lc> (end lower case), <font> (begin font or symbol), </font> (end font or symbol), <title> (begin tide for the document>, <body> (begin body for the document), </body> (end body), <table> (begin table), </table> (end table), <TR> (begin table row), </TR> (end table row), <TD> (begin table column), </TD> (end table column), etc. In some node structures, such as the one shown in FIGS. 2A–2G, end markers, such as </p>, </b></i> and </table>, are not explicitly shown. A data fragment may also be a title, an introduction, an abstract, a table of contents, a text sentence or paragraph, an equation, a visual image (e.g., a drawing), a photograph, a conclusion, an index, a format marker, reference to an external process, etc. Each data fragment of interest for a given document has a corresponding node in an ordered sequence of nodes.

Figure 1:
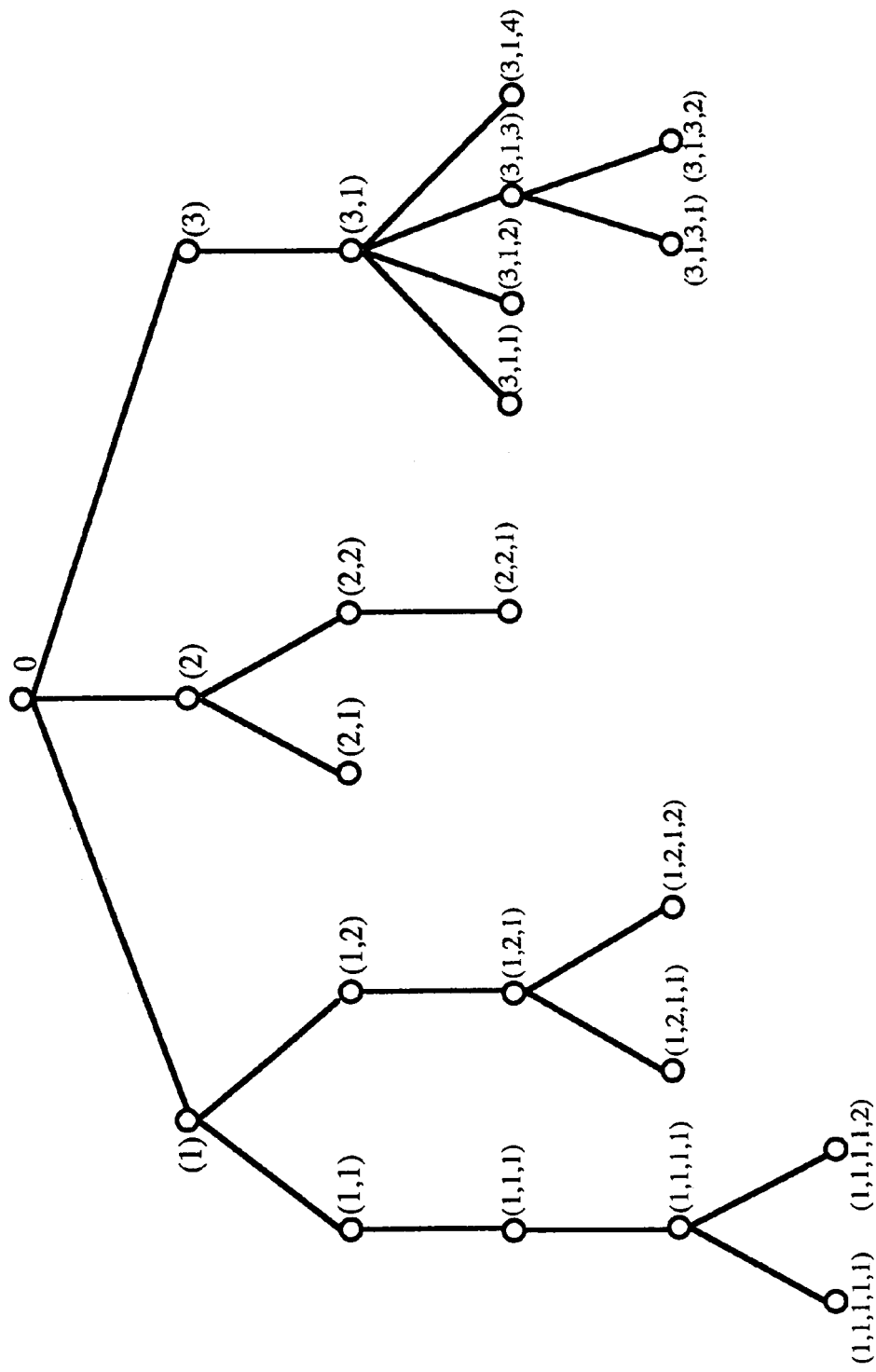
FIG. 1 illustrates a node structure, representing a document that might be encountered.
Figure 2A:
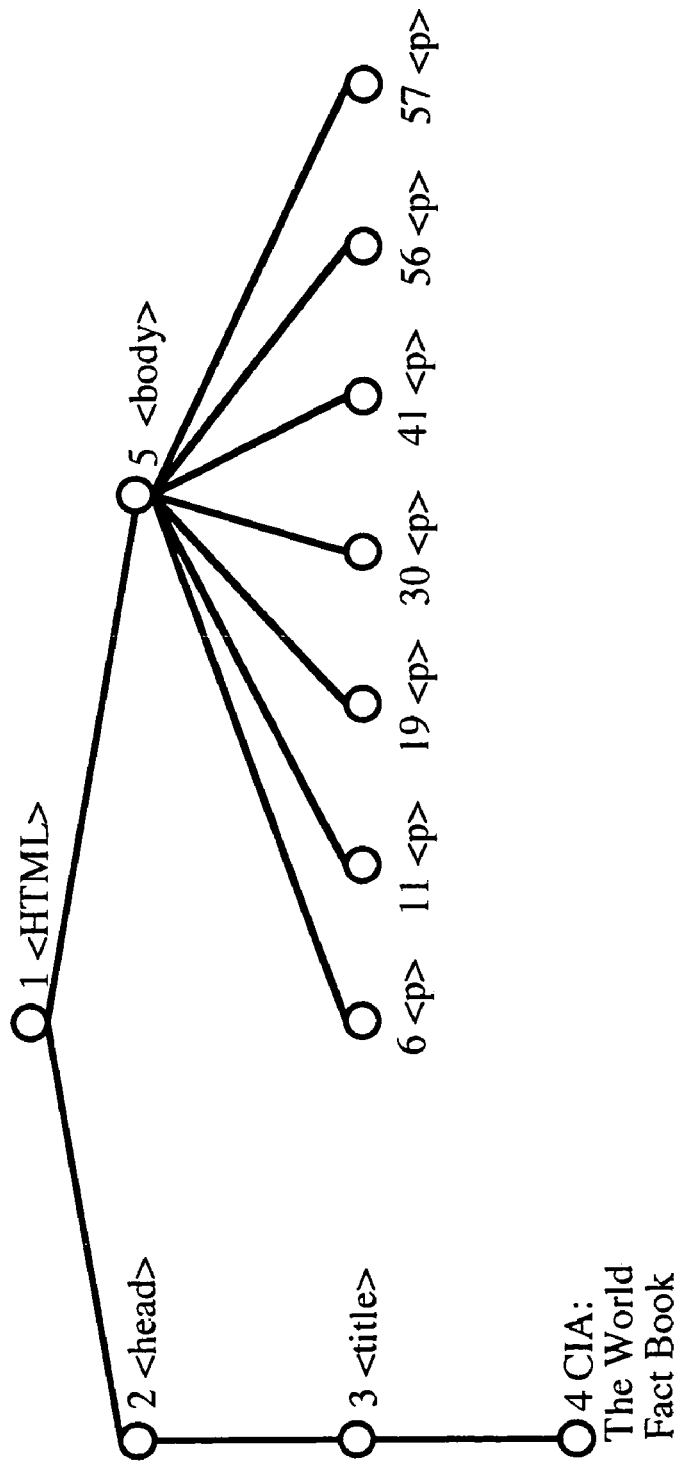

FIG. 1 illustrates a five-level node structure that might represent a document, considered as a connected array of nodes. The root node for the document, designated "0" and located at level 0, is the parent node for all nodes located at level no. 1, which has three nodes, designated as (1), (2), (3) for this example. The node (1) is parent of two child nodes at level no. 2, designated (1,1) and (1,2). The node (2) is parent node of two child nodes at level no. 2, designated (2,1) and (2,2). The node 3 is parent of one child node at level no. 2, designated (3,1).

The node (1,1) is parent of one child node at level no. 3, designated (1,1,1); the node (1,1,1) is parent of one child node at level no. 4, designated (1,1,1,1); and node (1,1,1,1) is parent node of two child nodes at level no. 5, designated (1,1,1,1,) and (1,1,1,1,2). The node 1,2 is parent of one child node at level no. 3, designated (1,2,1); and node (1,2,1) is parent node for two child nodes at level no. 4, designated (1,2,1,1) and (1,2,1,2). The nodes (1,1,1,1,1) and (1,1,1,1,2) have no child nodes.

The node (1,2,1) is parent of two child nodes at level no. 4, designated (1,2,1,1) and (1,2,1,2). The nodes (1,2,1,1) and (1,2,1,2) have no child nodes.

The node (2) is parent node of two child nodes at level no. 2, designated (2,1) and (2,2); and the node (2,2) is parent node for one child node at level no. 3, designated (2,2,1). The nodes (2,1) and (2,2,1) have no child nodes.

The node (3) is parent node for one child node at level no. 2, designated as (3,1). The node (3,1) is parent node for four child nodes at level no. 3, designated as (3,1,1), and (3,1,2) and (3,1,3) and (3,1,4). The nodes (3,1,1) and (3,1,2) and (3,1,4) have no child nodes. The node (3,1,3) is parent node for two child nodes, designated as (3,1,3,1) and (3,1,3,2), at level no. 4. The nodes (3,1,3,1) and (3,1,3,2) have no child nodes. The node structure shown in FIG. 1 is much simpler than a node structure for an actual document, which may have hundreds of levels and may have tens of siblings that are part of a sibling group.

When a search is initiated, based on receipt of a query and associated query attribute(s), at least one keyword or phrase is received by the search system and used to search for and identify at least one initial node within a node structure whose NODE DATA includes the specified keyword (context and/or content). This initial node may be anywhere in the node structure. If no node of the node structure has at least a partial match with the received query, this document is set aside, and another document, if any, in the collection is queried. If the document has at least a partial match to the keyword or phrase the system moves to the left-most sibling node of the sibling group for the initial node and optionally moves upward one level, to the parent node for that group of siblings, in order to provide a further context search. As an example, if the initial node is (3,1,3) in FIG. 1, the system will move to the left-most node (3,1,1) and up one level to the parent node (3,1). If the initial node is (1,2,1,1) in FIG. 1, which is the left-most node for that sibling group, the system will move up one level to the parent node (1,2,1), If the system needs additional content, and the present node is (1,2,1), the system will move down one level, to a child node that is part of a sibling node group, which in this instance is {1,2,1,1), (1,2,1,2)}.

For illustrative purposes, an embodiment of the invention using the Oracle ROWID database management system will be discussed. Other database management systems, such as. IBM Universal DB2, Sybase and Informix, can also be used with the invention. The ROWID system identifies a physical record location on a computer storage medium (disk, tape, flash memory, etc.). The invention uses at least four attributes or labels associated with each node in a node structure, and ROWID is not part of any attribute for this node structure:

DOCID (refers to and identifies the document with a unique assigned number or character set);

NODEID (identifies each node in a node structure, as illustrated in FIG. 1);

NODENAME (contains the node name, whether descriptive or not; a node name is specified by a first keyword within brackets < . . . >);

NODETYPE (identifies a node type from a limited set of node types, here as few as six node types);

NODEDATA (contains the data fragment or data block; usually located between two consecutive bracket pairs < . . . > and < . . . >);

PARENTROWID (identifies the parent node of the subject node; includes the ROWID of the preceding node in a sequence); and SIBLINGID (identifies left-adjacent sibling node, if any, of the subject node; contains the ROWID of a node, if any, previously created with the same hierarchical level).

In the preferred embodiment of the invention, six mutually exclusive node types are used, although any number can be prescribed:

Element (node type 0) Identifies a format marker or certain other nodes

Text (node type 1) Identifies free text; also the default node type

Context (node type 2) NODEDATA describes context of following node

Intense (node type 3) NODENAME describes context of following node

Simulation (node type 4) NODEDATA is constructed using an external process rather than being stored Binary (node type 5) NODEDATA is composed of binary block(s)

The DOCID attribute is associated with all nodes in the node structure that corresponds to that document. The NODEID attribute may be a relatively simple one, such as the (a, b, c, d, e) node naming system in the example shown in FIG. 1, or may be more complex, as long as each node in a given node structure has a unique node name and the node naming system is relatively efficient. The NODEDATA attribute may be the data fragment itself or may be a pointer that indicates the essentials of the data fragment information. The NODETYPE attribute will be an integer or a symbol (e.g., 0, 1, 2, 3, 4 or 5), representing the type the node is exclusively assigned to. The SIBLINGID attribute may refer to the left-most sibling in the sibling group that includes the subject node.

Consider the following excerpt from a document, including a title and a document body for illustrative purposes.

CIA: The World Factbook 2000

[Field Listing] One Two Three [The World Factbook Home]

Railways (Country Profile Category: Transportation)

Afghanistan
total: 24.6 km
broad gauge: 9.6 km, 1.524-m gauge from Gushgy to Towragbondi; 15 km 1.524 m gauge from Termiz to Kheyrabad Albania
total: 670 km
standard gauge: 670 km 1.435-m gauge Algeria
total: 4,820 km
standard gauge: 3664 km 1.435-m gauge
narrow gauge: 1.156 km 1.055-m gauge FIGS. 2A–2G illustrate a node structure that is suitable to describe this (excerpted) document, including a numerical NODEID for each node and the format markers <p> (paragraph break), <br> (line break), <b> (begin bold), <i> (begin italic), <head> (begin head of document), <title> (set off tide for document), <body> (begin body of document), <TD> (begin a new column) and <TR> (begin a new row). The text associated with some of the nodes (e.g., 29 and 51) is abbreviated to enhance clarity in FIGS. 2A–2G. Table 1 sets forth the HTML statement corresponding to the preceding excerpt.

The node structure begins at a root node, labeled <HTML> and includes several connected node segments. A first node segment (connected to the HTML node) begins with <head> and continues with <title> and the text "CIA: The World Fact Book." A second node segment begins with <body> and "bifurcates" seven ways. A first bifurcation includes <p>, which trifurcates to the text "Field Listing one two three" in one branch, to <i> and the text "The World Fact Book" in a second branch, and to <home> in a third branch.

A second bifurcation begins with <p> and continues with <TR> and <TD>, then branches at <TD> into a first branch of <b> and the text "Railways", into a second branch with <br>, and into a third branch with the text "Country profile category: Transportation."

A third bifurcation begins with <p> and has seven branches. The first branch includes <b> and the text "Afghanistan." The second branch has <br>. The third branch has <i> and the text "total:." The fourth branch is the text "24.6 km." The fifth branch has <br>. The sixth branch has <i> and the text "broad gauge." The seventh branch is the text "24.6 km 1.524-m gauge."

A fourth bifurcation begins with <p> and has eight branches. The first branch begins with <b> and continues with the text "Albania." The second branch has <br>. The third branch has <i> and the text "total:." The fourth branch is the text "670 km." The fifth branch has <br>. The sixth branch has <i> and the text "standard gauge." The seventh branch has <br>. The eighth branch has the text "670 km 1.435-m gauge (1996)."

The fifth bifurcation begins with <p> and has ten branches. The first branch begins with <b> and continues with the text "Algeria." The second branch has a single node, <br>. The third branch has <i> and the text "total:." The fourth branch is the text "4,820 km (301 km electrified; 215 km double track)". The fifth branch has <br>. The sixth branch has <i> and the text "standard gauge." The seventh branch is the text "3,664 km 1.435-m gauge (301 km electrified; 215 km double track). " The eighth branch has <br>. The ninth branch has <i> and the text "narrow gauge:" The tenth branch is the text "1.156 km 1.055-m gauge (1996)."

In a node structure, each node segment ends with text. A node structure for an actual document would be much more complex and have hundreds or thousands of bifurcations, branches and node segments.

The sixth bifurcation has a single node, <HR>. The seventh bifurcation begins with <p> and has three branches. The first branch has a single node, "Field Listing." The second branch has <i> and the text "The World Factbook." The third branch has a single node, <home>.

The approach disclosed herein is applicable to an Unstructured document, which is defined herein as a document that has an incomplete set of format markers, or lacks all format markers. The approach disclosed herein also applies to a semi-structured document and to a fully structured document.

An XML table for an arbitrary database schema constructed according to the invention, sets forth a group of attributes associated with each node. More specifically, two of the attributes are ROWID data type and are labeled PARENTROWID and SIBLINGID. A ROWID data type maps to the physical location on the storage medium. Each record in the XML table is associated with, and is accessed by specifying, a single ROWID. This ROWID is also used as an index for reference to the row entry. The SIBLINGID entry in a row, corresponding to a node, points to or specifies the ROWID of another row entry (the left-adjacent node). The PARENTROWID entry in a row also points to or specifies the ROWID of another row entry.

The XML Table 2 provides and example of the structure of a query, shown immediately following "Table 2. Query Example." Table 2 sequentially sets forth an 18-character ROWID indicium and six attributes, NODEID, NODENAME, NODETYPE, NODEDATA, PARENTROWID and SIBLINGID, for each of the 61 nodes shown in FIGS. 2A–2G, beginning with the root node HTML and moving from left toward the right and from the top toward the bottom in FIGS. 2A–2G. For this example, the NODENAMEs are drawn from a group {HTML, <Head>, <Body>, <Table>, <TR>, <TD>, <p>, <i>, <br>, <b>} A different example might use a different list of NODENAMEs, but the format markers (NODETYPE 0) would be similar. The NODEDATA column sets forth the text associated with each node of NODETYPE 1.

This set of six attributes associated with each document node can be reduced to four or five independent attributes by adopting certain reconfigurations. The number of NODENAMEs is relatively small; ten NODENAMEs are shown in Table 2, and a full list of NODENAMEs is estimated to include no more than about 50. Each NODENAME corresponds to precisely one of the six NODETYPEs set forth herein. Thus, the NODETYPE attribute can be merged into the NODENAME attribute, through a simple association or mapping of each NODENAME onto its corresponding NODETYPE, thus eliminating one node attribute.

Next, the three attributes NODEID, PARENTROWID AND SIBLINGID for any document node are replaced by two or three attributes in certain situations. The SIBLINGID for the left-most sibling is the same as the PARENTROWID for this left-most sibling so that no information is lost for this left-most node by dropping the PARENTROWID attribute when the node is the left-most sibling node in a sibling group. The node structure is assumed to be numbered so that a parent node and a left-most sibling node (child) for that parent node differ by 1, as implemented in FIGS. 2A–2G. For example, for the parent NODEID 14 and the left-most sibling NODEID 15, the parent-child differential NODEID is $\Delta(NODEID)=15-14=+1$. Here, $\Delta(NODEID)$ is defined as NODEID(child)−NODEID(parent). For this situation, the PARENTROWID (or, alternatively, the SIBLINGID) can be dropped as redundant for the left-most sibling node, as can be verified from examination of Table 2. Where the sibling node is not the left-most node in a sibling group (e.g., the NODEID 17 or 18 in FIGS. 2A–2G), the parent-child $\Delta(NODEID) \geq 2$. For example, for the parent-child node pair 14 and 17, $\Delta(NODEID)=17-14=3$. In this formulation, the NODEID value for each node is replaced by the $\Delta(NODEID)$ value for the parent-child node pair, from which the NODEID is easily generated.

Where $\Delta(NODEID)=1$, the redundant PARENTROWID (or SIBLINGID) is dropped, and the remaining attributes are SIBLINGID (or PARENTROWID) and $\Delta(NODEID)$ (=1), and another attribute has been eliminated, resulting in four attributes. Where $\Delta(NODEID) \geq 2$ (for a parent-child node pair in which the child node is not the left-most sibling node), the PARENTROWID and SIBLINGID attributes (which are independent in this situation) and the $\Delta(NODEID)$ are all set forth, requiring all three attributes.

In one situation (given node is the left-most node in a sibling group), the number of independent attributes is reduced to four. In any other situation (given node is not the left-most sibling node), the number of independent attributes is reduced to five.

Figure 3A:
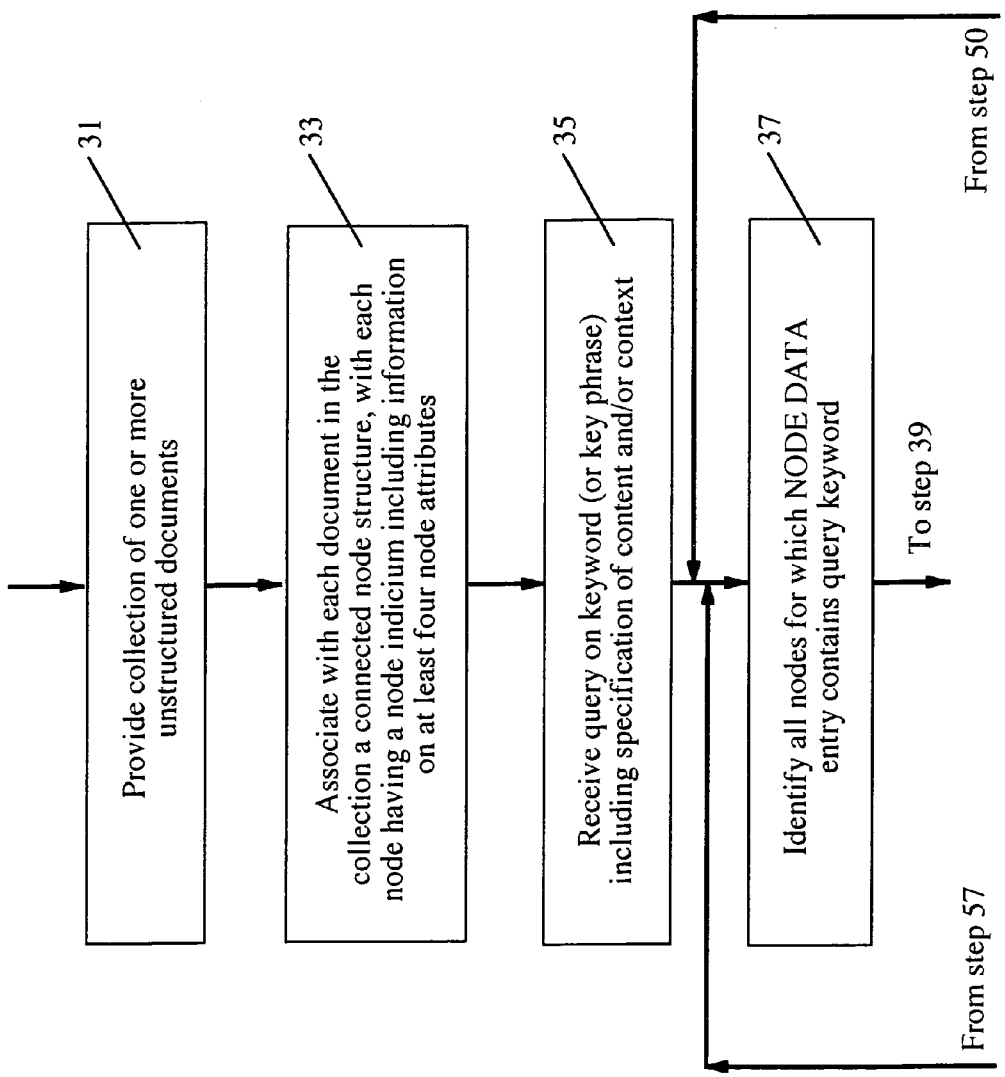
FIGS. 3A and 3B are a flow chart of a procedure for practicing the invention.
Figure 3B:
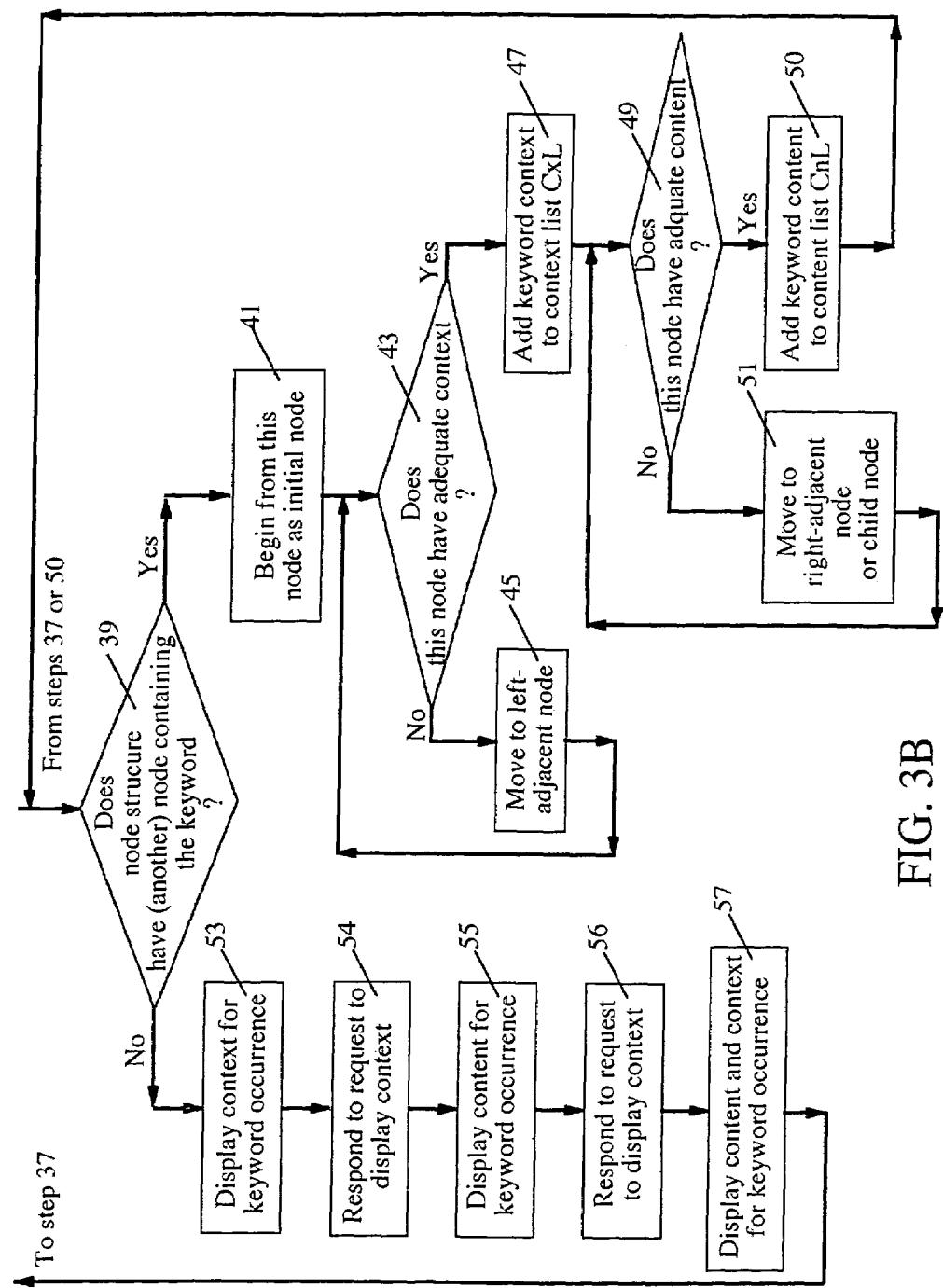

FIGS. 3A–3B are a flow chart illustrating a procedure for practicing the invention. In step 31, the system provides a collection or database of one or more Unstructured documents. Each document in the database is already indexed, with reference to the NODEDATA nodes in the associated node structure, and each text word that appears in the document is set forth in a listing (optionally alphabetical), although the location of the text word is not specified in this listing.

In step 33, the system associates with each document in the collection a connected node structure including an ordered sequence of document nodes, with each node labeled by a document node indicium that includes information on at least four of the following attributes associated with the document node: (1) a first attribute (NODEID or $\Delta(NODEID)$) that allows identification of a unique number associated with the document node; (2) a second attribute (NODENAME) that specifies a descriptive label for the document node; (3) a third attribute (NODETYPE, optional) that specifies data type for the document, from among a group of selected data types, including at least element, text, context, intense, simulation and binary, and indicates processing requirements for the document node; (4) a fourth attribute (NODEDATA) that provides text data, if any, associated with the document node; (5) a fifth attribute (PARENTROWID, optional) that specifies a node label, if any, for a node, if any, that serves as a parent node for the document node; and (6) a sixth attribute (SIBLINGID, optional) that specifies a node label, if any, for a node, if any that serves as a sibling node for the document node. One of the at least four attributes must include NODEDATA information.

In step 35, the system receives a query, including at least one query keyword (or keyphrase), for the collection of documents. This query includes a user specification of whether to search for context, for content, or for both context and content. Alternatively, a user may specify one keyword for context and one keyword for content. In step 37, the system searches the database index (illustrated in Table 2 for a single document) to identify all nodes for which the corresponding NODEDATA entries in the index contain the keyword (as text). In step 39, the system determines if the node structure presently examined has (another) node containing the keyword. This keyword may be part of a "leaf node" (the last node in a segment, usually, though not always, a text word) or may be a non-leaf node. For a given node structure, this determination preferably begins at an "earliest node" (i.e., a node closest to the node structure root node) and proceeds downward, as illustrated in FIGS. 2A–2G.

If the answer to the query in step 39 is "yes," the system begins from this node as an initial node, in step 41, and determines if this node has adequate context, in step 43. As indicated in the preceding, an initial node may be a context node (e.g., for the format word "table") rather than a true text word.

If the answer to the query in step 43 is "no," the system moves to a left-adjacent node of the initial node, in step 45, and returns to step 43 to determine if this (left-adjacent) node contains adequate context. At some point in this iterative inquiry, the query in step 43 will be answered "yes" and the system will proceed to step 45 (and ultimately return to step 39).

If the answer to the query in step 43 is "yes," the system adds the keyword context, and its location within the node structure and its ROWID, to a context list CxL that corresponds to the keyword, in step 47.

The system moves to step 49 (optional) and determines if the initial node has adequate content. "Adequate context" and "adequate content" are preferably user-defined or can be one or more criteria that are built into the system. If the answer to the query in step 49 is "yes," the system adds the keyword to a content list CnL, in step 50 (optional) and returns to step 39 to identify another node, if any, in the node structure for the present document in S that contains the keyword. If the answer to the query in step 49 is "no," the system moves to a right-adjacent node or to a selected child node of the initial node, in step 51 (optional), and returns to step 49. Ultimately, the system returns to step 39.

If the query in step 39 is answered "no," this indicates that the iterative inquiry has exhausted the list of occurrences of the keyword (as text and as context) for this document. In this situation, the system moves to step 53 (optional) or to step 55 (optional) or to step 57 (optional). Only one of steps 53, 55, and 57 is performed. In step 53, the system displays the context for an occurrence of the keyword(s) in the context list CxL; optionally, the user must affirmatively request display of the keyword as content, if any, associated with this context, in step 54. In step 55, the system displays the content, if any, associated with the content for the keyword in the list CnL; optionally, the user must affirmatively request display of the context of the keyword from the list CxL, in step 56. In step 57, the system displays both the context and the content, if any, and context for the occurrence of the keyword in the list CxL. Optionally, after step 54 or 56 or 57, the system then returns to step 37 and receives another document from the sub-collection S for analysis, after exhausting the keyword search in the present document. Herein, "display" of a result refers to any of (1) visually displaying a result, (2) storing a result for future use and (3) providing a result for further processing and/or analysis.

As noted in the preceding, the number of independent node attributes can be reduced to five or to four for each node in a node structure, depending upon the parent node-child node differential node value.

The system disclosed here uses a ROWID, or any equivalent specification, for its search. A ROWID is a relational database concept that specifies a unique physical address or row identifier mapping to each record for each table in the database. A ROWID provides the fastest access to a record or corresponding node within a relational table, with a single read block access. Accessing a record based on its physical address ROWID provides an efficient, constant access time C (machine-dependent; normally in the millisecond range) that is independent of the number of records or nodes in the database and regardless of maximum node depth within a node structure. The time to respond to a keyword query is thus approximately proportional to log(N) (first search time) plus a sum of the C's for each successive search, where N is the number of records or nodes.

Jones, Berkley, Bojilova and Schildhauer, in "Managing Scientific Metadata", I.E.E.E. Internet Computing (September–October 2001) pp. 59–68, present an interesting alternative approach that utilizes nested SQL queries and/or pre-computed path indices for its search. The Metacat pre-computed index provides a key in the form of absolute or relative query paths and corresponding pointers to where the deepest node unique identifier is located within an index table. A pre-computed index query usually allows superior performance, relative to a nested query approach, because each node is represented as a database row. However, search time in a database with this structure increases logarithmically with the number of records searched. The time to respond to a keyword query, using Metacat, is thus approximately proportional to log(N) (first search time) plus a sum of the $Log(N_i)$ for each successive search, where $N_i$ is the number of records examined in the ith search. The Metacat search time appears to be much larger than the search time for the system disclosed in the preceding, for a reasonable-sized database. Metacat performance is strongly dependent upon document structure and node depth. Documents dealing with different topics, for example, ecology and aviation, can produce markedly different performance values using Metacat, as compared to using nested queries.

TABLE 1

HTML Statement For World Factbook Example

```
<HTML><HEAD><TITLE>
CIA -- The World Factbook -- Railways
<TITLE><HEAD><BODY BGCOLOR="#FFFFFF"><p><CENTER>
    <a href="../indexfld.html" name="top">[Field Listing] one</a>
two <a href="../index.html">three [<i>The World Factbook</i> Home]</a>
<p><CENTER></p><table border="0" cellspacing="0" cellspacing="3"
    width=100%<TR>
<td align="center" bgcolor="#C0C0C0" width=100%><b><font
    size="+2"> 
Railways</font></b><br>(Country profile category:
    Transporation)</td></TR></TABLE>
<p><b>Afghanistan:</b>
<br><i>total:</i>
24.6 km
<br><i>broad gauge:</i>
9.6 km 1.524-m gauge from Gushgy (Turkmenistan) to Towraghondi; 15 km
    1.524-m gauge from Termiz (Uzbekistan) to Kheyrabad transshipment
    point on south bank of Amu Darya
<p><b>Albania:</b>
<br><i>total:</i>
670 km
<br><i>standard gauge:</i>
670 km 1.435-m gauge (1996)
<p><b>Algeria:</b>
<br><i>total:</i>
4,820 km (301 km electrified; 215 km double track)
<br><i>standard gauge</i>
3,664 km 1.435-m gauge (301 km electrified; 215 km double track)
<br><i>narrow gauge</i>
1,156 km 1.055-m gauge (1996)
<HR SIZE="3" WIDTH="100%" NOSHADE><p><CENTER>
```

TABLE 1-continued

HTML Statement For World Factbook Example

<a href="../indexfld.html">[Field Listing]</a>
<a href="../index.html"[<i>The World Factbook<///i>Home]</a>
<p><CENTER></BODY></HTML>

TABLE 2

Query Example

SQL> select rowid||' |', nodeid, nodename, nodetype, nodedata, parentrowid, siblingid from xml where doc_id = 336

| ROWID||'|' | NODE-ID | NODE NAME | NODE TYPE | NODEDATA | PARENTROWID | SIBLINGID |
|---|---|---|---|---|---|---|
| AAAJTVAAJAAAYRLABY | | 1 | HTML | 0 | | | |
| AAAJTVAAJAAAYRLABZ | | 2 | HEAD | 0 | | AAAJTVAAJAAAYRLABY | AAAJTVAAJAAAYRLABY |
| AAAJTVAAJAAAYRLABa | | 3 | | 3 | TITLE | AAAJTVAAJAAAYRLABZ | AAAJTVAAJAAAYRLABZ |
| AAAJTVAAJAAAYRLABb | | 4 | | 4 | CIA The World Factbook 2000 Railways | AAAJTVAAJAAAYRLABa | AAAJTVAAJAAAYRLABa |
| AAAJTVAAJAAAYRLABc | | 5 | BODY | 0 | | AAAJTVAAJAAAYRLABY | AAAJTVAAJAAAYRLABZ |
| AAAJTVAAJAAAYRLABd | | 6 | p | 0 | | AAAJTVAAJAAAYRLABc | AAAJTVAAJAAAYRLABc |
| AAAJTVAAJAAAYRLABe | | 7 | | 1 | Field Listing one two three | AAAJTVAAJAAAYRLABd | AAAJTVAAJAAAYRLABd |
| AAAJTVAAJAAAYRLABf | | 8 | I | 2 | | AAAJTVAAJAAAYRLABd | AAAJTVAAJAAAYRLABe |
| AAAJTVAAJAAAYRLABg | | 9 | | 1 | The World Factbook | AAAJTVAAJAAAYRLABf | AAAJTVAAJAAAYRLABf |
| AAAJTVAAJAAAYRLABh | | 10 | | 1 | Home | AAAJTVAAJAAAYRLABd | AAAJTVAAJAAAYRLABf |
| AAAJTVAAJAAAYRLABi | | 11 | p | 0 | | AAAJTVAAJAAAYRLABc | AAAJTVAAJAAAYRLABd |
| AAAJTVAAJAAAYRLABj | | 12 | table | 0 | | AAAJTVAAJAAAYRLABi | AAAJTVAAJAAAYRLABi |
| AAAJTVAAJAAAYRLABk | | 13 | TR | 0 | | AAAJTVAAJAAAYRLABj | AAAJTVAAJAAAYRLABj |
| AAAJTVAAJAAAYRLABl | | 14 | td | 0 | | AAAJTVAAJAAAYRLABk | AAAJTVAAJAAAYRLABk |
| AAAJTVAAJAAAYRLABm | | 15 | b | 2 | | AAAJTVAAJAAAYRLABl | AAAJTVAAJAAAYRLABl |
| AAAJTVAAJAAAYRLABn | | 16 | | 1 | Railways | AAAJTVAAJAAAYRLABn | AAAJTVAAJAAAYRLABm |
| AAAJTVAAJAAAYRLABo | | 17 | br | 0 | | AAAJTVAAJAAAYRLABl | AAAJTVAAJAAAYRLABm |
| AAAJTVAAJAAAYRLABp | | 18 | | 1 | Country profile category Transportation | AAAJTVAAJAAAYRLABl | AAAJTVAAJAAAYRLABo |
| AAAJTVAAJAAAYRLABq | | 19 | p | 0 | | AAAJTVAAJAAAYRLABc | AAAJTVAAJAAAYRLABi |
| AAAJTVAAJAAAYRLABr | | 20 | b | 2 | | AAAJTVAAJAAAYRLABq | AAAJTVAAJAAAYRLABq |
| AAAJTVAAJAAAYRMAAA | | 21 | | 1 | Afghanistan | AAAJTVAAJAAAYRLABr | AAAJTVAAJAAAYBLABr |
| AAAJTVAAJAAAYRMAAB | | 22 | br | 0 | | AAAJTVAAJAAAYRLABq | AAAJTVAAJAAAYRLABr |
| AAAJTVAAJAAAYRMAAC | | 23 | i | 2 | | AAAJTVAAJAAAYRLABq | AAAJTVAAJAAAYRMAAB |
| AAAJTVAAJAAAYRMAAD | | 24 | | 1 | total | AAAJTVAAJAAAYRMAAC | AAAJTVAAJAAAYRMAAC |
| AAAJTVAAJAAAYRMAAE | | 25 | | 1 | 24 6 km | AAAJTVAAJAAAYRLABo | AAAJTVAAJAAAYRMAAC |
| AAAJTVAAJAAAYRMAAF | | 26 | br | 0 | | AAAJTVAAJAAAYRLABq | AAAJTVAAJAAAYRMAAE |
| AAAJTVAAJAAAYRMAAG | | 27 | i | 2 | | AAAJTVAAJAAAYRLABq | AAAJTVAAJAAAYRMAAE |
| AAAJTVAAJAAAYRMAAH | | 28 | | 1 | broad gauge | AAAJTVAAJAAAYRMAAG | AAAJTVAAJAAAYRMAAG |
| AAAJTVAAJAAAYRMAAI | | 29 | | 1 | 9 6 km 1 524 m gauge from Gushgy Turkmenistan to Towraghondi 15 km 1 524 m gauge | AAAJTVAAJAAAYRLABq | AAAJTVAAJAAAYRMAAG |
| AAAJTVAAJAAAYRMAAJ | | 30 | p | 0 | | AAAJTVAAJAAAYRLABc | AAAJTVAAJAAAYRLABq |
| AAAJTVAAJAAAYRMAAK | | 31 | b | 2 | | AAAJTVAAJAAAYRMAAJ | AAAJTVAAJAAAYRMAAJ |
| AAAJTVAAJAAAYRMAAL | | 32 | | 1 | Albania railway, out | AAAJTVAAJAAAYRMAAK | AAAJTVAAJAAAYRMAAK |
| AAAJTVAAJAAAYRMAAM | | 33 | br | 0 | | AAAJTVAAJAAAYRMAAJ | AAAJTVAAJAAAYRMAAK |
| AAAJTVAAJAAAYRMAAN | | 34 | i | 2 | | AAAJTVAAJAAAYRMAAJ | AAAJTVAAJAAAYRMAAM |
| AAAJTVAAJAAAYRMAAO | | 35 | | 1 | total | AAAJTVAAJAAAYRMAAN | AAAJTVAAJAAAYRMAAN |
| AAAJTVAAJAAAYRMAAP | | 36 | | 1 | 670 km | AAAJTVAAJAAAYRMAAJ | AAAJTVAAJAAAYRMAAN |
| AAAJTVAAJAAAYRMAAQ | | 37 | br | 0 | | AAAJTVAAJAAAYRMAAJ | AAAJTVAAJAAAYRMAAP |
| AAAJTVAAJAAAYRMAAR | | 38 | i | 2 | | AAAJTVAAJAAAYRMAAJ | AAAJTVAAJAAAYRMAAQ |
| AAAJTVAAJAAAYRMAAS | | 39 | | 1 | standard gauge | AAAJTVAAJAAAYRMAAR | AAAJTVAAJAAAYRMAAR |
| AAAJTVAAJAAAYRMAAT | | 40 | | 1 | 670 km 1 435 m gauge 1996 | AAAJTVAAJAAAYRMAAJ | AAAJTVAAJAAAYRMAAB |
| AAAJTVAAJAAAYRMAAU | | 41 | p | 0 | | AAAJTVAAJAAAYRLABc | AAAJTVAAJAAAYRMAAJ |
| AAAJTVAAJAAAYRMAAV | | 42 | b | 2 | | AAAJTVAAJAAAYRMAAU | AAAJTVAAJAAAYRMAAU |
| AAAJTVAAJAAAYRMAAW | | 43 | | 1 | Algeria | AAAJTVAAJAAAYRMAAV | AAAJTVAAJAAAYRMAAV |
| AAAJTVAAJAAAYRMAAX | | 44 | br | 0 | | AAAJTVAAJAAAYRMAAU | AAAJTVAAJAAAYRMAAV |
| AAAJTVAAJAAAYRMAAY | | 45 | i | 2 | | AAAJTVAAJAAAYRMAAU | AAAJTVAAJAAAYRMAAX |
| AAAJTVAAJAAAYRMAAZ | | 46 | | 1 | total | AAAJTVAAJAAAYRMAAY | AAAJTVAAJAAAYRMAAY |

TABLE 2-continued

Query Example

SQL> select rowid||' |', nodeid, nodename, nodetype, nodedata, parentrowid, siblingid from xml where doc__id = 336

| ROWID||'|' | NODE-ID | NODE NAME | NODE TYPE | NODEDATA | PARENTROWID | SIBLINGID |
|---|---|---|---|---|---|---|
| AAAJTVAAJAAAYRMAAa | 47 | | 1 | 4 820 km 301 km electrified 215 km double track | AAAJTVAAJAAAYRMAAU | AAAJTVAAJAAAYRMAAY |
| AAAJTVAAJAAAYRMAAb | 48 | br | 0 | | AAAJTVAAJAAAYRMAAU | AAAJTVAAJAAAYRMAAa |
| AAAJTVAAJAAAYRMAAc | 49 | i | 2 | | AAAJTVAAJAAAYRMAAU | AAAJTVAAJAAAYRMAAb |
| AAAJTVAAJAAAYRMAAd | 50 | | 1 | standard gauge | AAAJTVAAJAAAYRMAAc | AAAJTVAAJAAAYRMAAc |
| AAAJTVAAJAAAYRMAAe | 51 | | 1 | 3 664 km 1 435 m gauge 301 km electrified 215 km double track | AAAJTVAAJAAAYRMAAU | AAAJTVAAJAAAYRMAAc |
| AAAJTVAAJAAAYRMAAf | 52 | br | 0 | | AAAJTVAAJAAAYRMAAU | AAAJTVAAJAAAYRMAAe |
| AAAJTVAAJAAAYRMAAg | 53 | i | 2 | | AAAJTVAAJAAAYRMAAU | AAAJTVAAJAAAYRMAAf |
| AAAJTVAAJAAAYRMAAh | 54 | | 1 | narrow gauge | AAAJTVAAJAAAYRMAAg | AAAJTVAAJAAAYRMAAg |
| AAAJTVAAJAAAYRMAAi | 55 | | 1 | 1 156 km 1 055 m gauge 1996 | AAAJTVAAJAAAYRMAAU | AAAJTVAAJAAAYRMAAg |
| AAAJTVAAJAAAYRMAAj | 56 | HR | 0 | | AAAJTVAAJAAAYRLABc | AAAJTVAAJAAAYRMAAU |
| AAAJTVAAJAAAYRMAAk | 57 | p | 0 | | AAAJTVAAJAAAYRLABc | AAAJTVAAJAAAYRMAAj |
| AAAJTVAAJAAAYRMAAl | 58 | | 1 | Field Listing | AAAJTVAAJAAAYRMAAk | AAAJTVAAJAAAYRMAAk |
| AAAJTVAAJAAAYRMAAm | 59 | I | 2 | | AAAJTVAAJAAAYRMAAk | AAAJTVAAJAAAYRMAAl |
| AAAJTVAAJAAAYRMAAn | 60 | | 1 | The World Factbook | AAAJTVAAJAAAYRMAAm | AAAJTVAAJAAAYRMAAm |
| AAAJTVAAJAAAYRMAAo | 61 | | 1 | Home | AAAJTVAAJAAAYRMAAk | AAAJTVAAJAAAYRMAAm |

61 rows selected.

What is claimed is:

1. A computer-implemented method for querying a collection of Unstructured documents, the method comprising:

(1) providing an Unstructured collection including at least one document;

(2) associating with each document in the collection a connected node structure including an ordered sequence of document nodes, with each node being labeled by a document node indicium that provides information on at least four of the following attributes associated with the node and corresponding to at least one document: (1) a first attribute that allows identification of a unique number associated with the node; (2) a second attribute that specifies a descriptive label for the node; (3) a third attribute that specifies data type for the node, from among at least two selected data types, and indicates processing requirements for the node; (4) a fourth attribute that provides text data, if any, associated with the node; (5) a fifth attribute that specifies a node label, if any, for a node, if any, that serves as a parent node for the node; and (6) a sixth attribute that specifies a node label, if any, for a node, if any, that serves as a sibling node for the node, where information from the fourth attribute is included in the node indicium;

(3) receiving a query, including at least one query keyword, for the collection of documents, and specifying at least one of keyword context and keyword content;

(4) determining a set of query nodes in the node structure, each of which contains at least one occurrence of the keyword in the fourth attribute;

(5) providing information on at least one selected fourth attribute containing the keyword, for at least one query node in the query node set;

(6) determining if the query specifies context for the keyword;

(7) when the query specifies context for the keyword, determining if the query node provides context for the keyword;

(8) when the query node does not provide context for the keyword, replacing the query node by a left-adjacent node as a new query node, and returning to step (7) at least once;

(9) when the query node provides context for the keyword, adding the query node to a context list, and returning to step (5) at least once;

(10) determining if the query specifies content for the keyword;

(11) when the query specifies content for the keyword, determining if the query node provides content for the keyword;

(12) when the query node does not provide content for the keyword, replacing the query node by at least one of a right-adjacent node and a selected child node as a new query node, and returning to step (11) at least once; and

(13) when the query node provides content for the keyword, adding the query node to a content list, and returning to said step (5) at least once.

2. The method of claim 1, further comprising displaying at least one of (i) said context in said context list and (ii) said content in said content list, for at least one of said query nodes.

3. The method of claim 1, further comprising providing said information on at least said first, second, fourth and sixth attributes.

4. The method of claim 1, further comprising:

labeling at least one of said document nodes with said indicium that provides information on at least five of said attributes; and providing said information on at least said first, second, fourth, fifth and sixth attributes.

5. A computer-implemented method for querying a collection of Unstructured documents, the method comprising:

(1) providing an Unstructured collection including at least one document;
(2) associating with each document in the collection a connected node structure including an ordered sequence of document nodes, with each node being labeled by a document node indicium that provides information on no more than four of the following attributes associated with the node: (1) a first attribute that allows identification of a unique number associated with the node; (2) a second attribute that specifies a descriptive label for the node; (3) a third attribute that specifies data type for the node, from among at least two selected data types, and indicates processing requirements for the document node; (4) a fourth attribute that provides text data, if any, associated with the node; (5) a fifth attribute that specifies a node label, if any, for a node, if any, that serves as a parent node for the node; and (6) a sixth attribute that specifies a node label, if any, for a node, if any, that serves as a sibling node for the node, where information from the fourth attribute is included in the node indicium;
(3) receiving a query, including at least one query keyword, for the collection of documents, and specifying at least one of context and content for the keyword;
(4) determining a set of query nodes in the node structure, each of which contains at least one occurrence of the keyword in the fourth attribute;
(5) providing information on at least one selected fourth attribute containing the keyword, for at least one query node in the query node set;
(6) determining if the query specifies context for the keyword;
(7) when the query specifies context for the keyword, determining if the query node provides context for the keyword;
(8) when the query node does not provide context for the keyword, replacing the query node by a left-adjacent node as a new query node, and returning to step (7) at least once;
(9) when the query node provides context for the keyword, adding the query node to a context list, and returning to step (5) at least once;
(10) determining if the query specifics content for the keyword;
(11) when the query specifies content for the keyword, determining if the query node provides content for the keyword;
(12) when the query node does not provide content for the keyword, replacing the query node by at least one of a right-adjacent node and a selected child node as a new query node, and returning to step (11) at least once; and
(13) when the query node provides content for the keyword, adding the query node to a content list, and returning to said step (5) at least once.

6. The method of claim 5, further comprising displaying at least one of (i) said context in said context list and (ii) said content in said content list, for at least one of said query nodes.

7. The method of claim 5, further comprising providing said information on said first, second, fourth and sixth attributes.

8. A computer-implemented method for querying a collection of Unstructured documents, the method comprising:
(1) providing an Unstructured collection including at least one document;
(2) associating with each document in the collection a connected node structure including an ordered sequence of document nodes, with each node being labeled by a document node indicium that provides information on no more than five of the following attributes associated with the node: (1) a first attribute that allows identification of a unique number associated with the node; (2) a second attribute that specifies a descriptive label for the node; (3) a third attribute that specifies data type for the node, from among at least two selected data types, and indicates processing requirements for the document node; (4) a fourth attribute that provides text data, if any, associated with the node; (5) a fifth attribute that specifies a node label, if any, for a node, if any, that serves as a parent node for the node; and (6) a sixth attribute that specifies a node label, if any, for a node, if any, that serves as a sibling node for the node, where information from the fourth attribute is included in the node indicium;
(3) receiving a query, including at least one query keyword, for the collection of documents, and specifying at least one of context and content for the keyword;
(4) determining a set of query nodes in the node structure, each of which contains at least one occurrence of the keyword in the fourth attribute;
(5) providing information on at least one selected fourth attribute containing the keyword, for at least one query node in the query node set;
(6) determining if the query specifies context for the keyword;
(7) when the query specifies context for the keyword, determining if the query node provides context for the keyword;
(8) when the query node does not provide context for the keyword, replacing the query node by a left-adjacent node as a new query node, and returning to step (7) at least once;
(9) when the query node provides context for the keyword, adding the query node to a context list, and returning to step (5) at least once;
(10) determining if the query specifies content for the keyword;
(11) when the query specifies content for the keyword, determining if the query node provides content for the keyword;
(12) when the query node does not provide content for the keyword, replacing the query node by at least one of a right-adjacent node and a selected child node as a new query node, and returning to step (11) at least once; and
(13) when the query node provides content for the keyword, adding the query node to a content list, and returning to said step (5) at least once.

9. The method of claim 8, further comprising displaying at least one of (i) said context in said context list and (ii) said content in said content list, for at least one of said query nodes.

10. The method of claim 8, further comprising providing said information on said first, second, fourth, fifth and sixth attributes.

11. A computer-implemented system for querying a collection of Unstructured documents, the system comprising a computer that is programmed:
(1) to provide an Unstructured collection including at least one document;
(2) to associate with each document in the collection a connected node structure including an ordered sequence of document nodes, with each node being labeled by a document node indicium that provides information on at least four of the following attributes associated with the node and corresponding to at least one document: (1) a first attribute that allows identification of a unique number associated with the node; (2) a second attribute that specifies a descriptive label for the node; (3) a third attribute that specifies data type for the node, from among at least two selected data types, and indicates processing requirements for the node; (4) a fourth attribute that provides text data, if any, associated with the node; (5) a fifth attribute that specifies a node label, if any, for a node, if any, that serves as a parent node for the node; and (6) a sixth attribute that specifies a node label, if any, for a node, if any, that serves as a sibling node for the node, where information from the fourth attribute is included in the node indicium;

(3) to receive a query, including at least one query keyword, for the collection of documents, and specifying at least one of keyword context and keyword content;

(4) to determine a set of query nodes in the node structure, each of which contains at least one occurrence of the keyword in the fourth attribute;

(5) to provide information on at least one selected fourth attribute containing the keyword, for at least one query node in the query node set;

(6) to determine if the query specifies context for the keyword;

(7) when the query specifies context for the keyword, to determine if the query node provides context for the keyword;

(8) when the query node does not provide context for the keyword, to replace the query node by a left-adjacent node as a new query node, and to return to step (7) at least once;

(9) when the query node provides context for the keyword, to add the query node to a context list, and to return to step (5) at least once;

(10) to determine if the query specifies content for the keyword;

(11) when the query specifies content for the keyword, to determine if the query node provides content for the keyword;

(12) when the query node does not provide content for the keyword, to replace the query node by at least one of a right-adjacent node and a selected child node as a new query node, and to return to step (11) at least once; and

(13) when the query node provides content for the keyword, to add the query node to a content list, and to return to said step (5) at least once.

12. The system of claim 11, wherein said computer is further programmed to display at least one of (i) said context in said context list and (ii) said content in said content list, for at least one of said query nodes.

13. The system of claim 11, wherein said computer is further programmed to provide said information on at least said first, second, fourth and sixth attributes.

14. The system of claim 11, wherein said computer is further programmed:
to label at least one of said document nodes with said indicium that provides information on at least five of said attributes; and
to provide said information on at least said first, second, fourth, fifth and sixth attributes.

15. A computer-implemented system for querying a collection of Unstructured documents, the system comprising a computer that is programmed:

(1) to provide an Unstructured collection including at least one document;

(2) to associate with each document in the collection a connected node structure including an ordered sequence of document nodes, with each node being labeled by a document node indicium that provides information on no more than four of the following attributes associated with the node and corresponding to at least one document; (1) a first attribute that allows identification of a unique number associated with the node; (2) a second attribute that specifies a descriptive label for the node; (3) a third attribute that specifies data type for the node, from among at least two selected data types, and indicates processing requirements for the node; (4) a fourth attribute that provides text data, if any, associated with the node; (5) a fifth attribute that specifies a node label, if any, for a node, if any, that serves as a parent node for the node; and (6) a sixth attribute that specifies a node label, if any, for a node, if any, that serves as a sibling node for the node, where information from the fourth attribute is included in the node indicium;

(3) to receive a query, including at least one query keyword, for the collection of documents, and specifying at least one of keyword context and keyword content;

(4) to determine a set of query nodes in the node structure, each of which contains at least one occurrence of the keyword in the fourth attribute;

(5) to provide information on at least one selected fourth attribute containing the keyword, for at least one query node in the query node set;

(6) to determine if the query specifies context for the keyword;

(7) when the query specifies context for the keyword, to determine if the query node provides context for the keyword;

(8) when the query node does not provide context for the keyword, to replace the query node by a left-adjacent node as a new query node, and to return to step (7) at least once;

(9) when the query node provides context for the keyword, to add the query node to a context list, and to return to step (5) at least once;

(10) to determine if the query specifies content for the keyword;

(11) when the query specifies content for the keyword, to determine if the query node provides content for the keyword;

(12) when the query node does not provide content for the keyword, to replace the query node by at least one of a right-adjacent node and a selected child node as a new query node, and to return to step (11) at least once; and

(13) when the query node provides content for the keyword, to add the query node to a content list, and to return to said step (5) at least once.

16. The system of claim 15, wherein said computer is further programmed to display at least one of (i) said context in said context list and (ii) said content in said content list, for at least one of said query nodes.

17. The system of claim 15, wherein said computer is further programmed to provide said information on said first, second, fourth and sixth attributes.

18. A computer-implemented system for querying a collection of Unstructured documents, the system comprising a computer that is programmed:

(1) to provide an Unstructured collection including at least one document;
(2) to associate with each document in the collection a connected node structure including an ordered sequence of document nodes, with each node being labeled by a document node indicium that provides information on no more than five of the following attributes associated with the node a corresponding to at least one document; (1) a first attribute that allows identification of a unique number associated with the node; (2) a second attribute that specifies a descriptive label for the node; (3) a third attribute that specifies data type for the node, from among at least two selected data types, and indicates processing requirements for the node; (4) a fourth attribute that provides text data, if any, associated with the node; (5) a fifth attribute that specifies a node label, if any, for a node, if any, that serves as a parent node for the node; and (6) a sixth attribute that specifies a node label, if any, for a node, if any, that serves as a sibling node for the node, where information from the fourth attribute is included in the node indicium;
(3) to receive a query, including at least one query keyword, for the collection of documents, and specifying at least one of keyword context and keyword content;
(4) to determine a set of query nodes in the node structure, each of which contains at least one occurrence of the keyword in the fourth attribute;
(5) to provide information on at least one selected fourth attribute containing the keyword, for at least one query node in the query node set;
(6) to determine if the query specifies context for the keyword;
(7) when the query specifies context for the keyword, to determine if the query node provides context for the keyword;
(8) when the query node does not provide context for the keyword, to replace the query node by a left-adjacent node as a new query node, and to return to step (7) at least once;
(9) when the query node provides context for the keyword, to add the query node to a context list, and to return to step (5) at least once;
(10) to determine if the query specifies content for the keyword;
(11) when the query specifies content for the keyword, to determine if the query node provides content for the keyword;
(12) when the query node does not provide content for the keyword, to replace the query node by at least one of a right-adjacent node and a selected child node as a new query node, and to return to step (11) at least once; and
(13) when the query node provides content for the keyword, to add the query node to a content list, and to return to said step (5) at least once.

19. The system of claim 18, wherein said computer is further programmed to display at least one of (i) said context in said context list and (ii) said content in said content list, for at least one of said query nodes.

20. The system of claim 18, wherein said computer is further programmed to provide said information on said first, second, fourth and sixth attributes.

* * * * *